(12) United States Patent
Lombardi (10) Patent No.: US 7,658,140 B2
(45) Date of Patent: Feb. 9, 2010

(54) PORTABLE RIFLE OR SHOTGUN AIMING SEAT APPARATUS AND KIT

(76) Inventor: James S. Lombardi, 13090 North Rd., Fenton, MI (US) 48430

( * ) Notice: Subject to any disclaimer, the term of this patent is extended or adjusted under 35 U.S.C. 154(b) by 108 days.

(21) Appl. No.: 11/983,323

(22) Filed: Nov. 8, 2007

(65) Prior Publication Data
US 2008/0163534 A1      Jul. 10, 2008

Related U.S. Application Data

(60) Provisional application No. 60/857,632, filed on Nov. 8, 2006.

(51) Int. Cl.
*F41A 23/24*      (2006.01)
(52) U.S. Cl. .................. 89/37.04; 42/94; 89/37.07; 89/37.13
(58) Field of Classification Search ............... 42/94; 89/37.02, 37.04, 37.05, 37.07, 37.09, 37.13
See application file for complete search history.

(56) References Cited

U.S. PATENT DOCUMENTS

| 1,892,914 | A | * | 1/1933 | Trimbach | 89/37.16 |
| 2,206,065 | A | * | 7/1940 | Trimbach et al. | 89/37.16 |
| 4,937,965 | A | * | 7/1990 | Narvaez | 42/94 |
| 2007/0169391 | A1 | * | 7/2007 | Carpenter | 42/94 |

* cited by examiner

*Primary Examiner*—Stephen M Johnson
(74) *Attorney, Agent, or Firm*—The Weintraub Group, PLC (57) ABSTRACT

A rifle or shotgun aiming seat apparatus is portable, erectable on the ground and/or as part of a ladder or tree stand. The apparatus incorporates therewith a seat and a rifle-positioning cradle that enables the user to remain in position and simultaneously rotate and selectively and rapidly adjust the height, distance and angular orientation of the rifle barrel, depending on the shooting environment presented. Additionally, the frame structure of the apparatus is adapted to be adjusted and leveled as to sloping ground and enables a hunting blind be erected to hide the hunter while in position.

20 Claims, 5 Drawing Sheets

PORTABLE RIFLE OR SHOTGUN AIMING SEAT APPARATUS AND KIT

CROSS-REFERENCE TO RELATED APPLICATION

This Application claims the benefit of U.S. Provisional Patent Application No. 60/857,632, filed Nov. 8, 2006, the disclosure of which is incorporated in its entirety.

BACKGROUND OF THE INVENTION

1. Field of the Invention

The present invention relates to a rifle or shotgun aiming seat apparatus that is portable, erectable on the ground, or as part of a ladder or tree stand, and enables a shooter to remain seated on the apparatus and simultaneously rotate with the rifle while maintaining the rifle in a desired shooting position, and more particularly, to such apparatus that enables each of the height, distance and angular orientation of a rifle positioning cradle to be rapidly adjusted depending on the shooting environment presented.

2. Description of the Prior Art

Aiming apparatus to assist a shooter in aiming a long rifle is known. Such aiming apparatus includes many features, which, in and of themselves, provide aid and assistance to a hunter or sharpshooter in shooting at a target, such as a deer. For example, illustrative are cradles for supporting and positioning the shooting end of a rifle (or shotgun) barrel, seats and benches to position the shooter with respect to a rifle cradle, and vertical (height) and/or horizontal adjustment arrangements.

Many of these arrangements, while useful, have not been integrated together to provide an aiming apparatus that is easy to use, is transportable, and once assembled in the field, enables the sharpshooter to make minor adjustments in the orientation of the rifle barrel relative to the physical frame of the shooter.

Generally, there remains a need for a wider choice of rifle aiming apparatus that enables a shooter, whether novice or experienced, and with different physical frames, both lean and portly, to rapidly transport and erect a rifle aiming apparatus on the ground, or on a tree stand, and thereafter make minor adjustments in the height, distance and angle of the end of the rifle barrel relative to a seat of the apparatus. Positioning the shooting end of the barrel is important to enable use of the apparatus by both right and left-handed shooters.

As used herein, the term rifle and rifle barrel is intended to encompass a wide variety of shooting arms, such as a shotgun, for example.

To maintain repeatability, should the hunter need to rotate and follow the target, the aiming structure would desirably integrate the aiming structure with the user and enable the hunter, rifle and aiming frame to rotate as a unit, thereby enabling rapid continuous tracking of the target without loss of height and range adjustments.

Briefly, and in general terms, an object of this invention is the provision of rifle aiming apparatus that enables rifle aiming components to be set relative to a seat element and the shooter and aiming components to be rotated simultaneously relative to a support frame wherein to maintain a preset arrangement between the hunter, the rifle, and a rifle barrel positioning cradle.

Another object of this invention is the provision of an aiming support, which is transportable, as a kit, and easily erected for use in the field.

SUMMARY OF THE INVENTION

In one embodiment according to this invention, there is provided a rifle aiming seat apparatus adapted to be assembled and supported on the ground for use and disassembled and transported when not in use, said support apparatus comprising:

a seat having an upper seat surface and a lower undersurface, an elongated seat brace, said brace extending between proximal and distal end portions and including a medial portion, the proximal end portion of said seat brace being connected to the undersurface of said seat, a horizontal main support frame including a seat support for supporting the proximal end portion of said seat brace and a guide rail for supporting the medial portion of said seat brace, said seat support and guide rail forming a plane disposed generally horizontally, means for rotatably connecting the proximal end portion of said seat brace to said seat support, the connection forming a pivot and an axis of rotation about which the seat brace rotates, and the medial portion of said seat brace being adapted to rotate approximately 180° relative to said axis and in supported relation atop the guide rail, an L-shaped rifle aiming bracket, said aiming bracket including first and second legs disposed at right angles to one another, and rifle cradle assembly and rifle cradle thereof, first means for adjustably connecting and changing the position of the first leg of said aiming bracket relative to the distal end portion of said seat brace, said first means connecting the first leg in different positions along the seat brace, orienting the second leg generally perpendicularly to the horizontal plane, and changing the separation of the second leg from the axis of rotation, and second means for adjustably connecting and changing the position of the rifle cradle relative to the distal end portion of the second leg of said aiming bracket, said second means connecting the rifle cradle in different positions along the second leg and moving the cradle up or down relative to the horizontal plane.

According to this embodiment, the aiming bracket also comprises third means for rotatably connecting the rifle cradle to the cradle assembly wherein the rifle cradle may be oriented at different angles relative to a central axis through said second leg. In this aspect, the third means for rotatably connecting includes an elongated tubular cradle sleeve having upper and lower end portions and a releasable locking pin. The lower end portion of the cradle sleeve is adjustably connected to the distal end portion of the second leg with the locking pin pinning and releasably locking the rifle cradle to the upper end portion of the cradle sleeve for pivoting rotation relative thereto, whereby the rifle cradle may be fixed at a desired angle relative to an axis through the cradle sleeve and the second leg to which connected.

The means for rotatably connecting the seat brace to the seat support comprises one and the other of the proximal end of said seat brace and seat support including a pivot pin and a socket adapted to receive the pivot pin.

According to this embodiment, the seat includes a seat back hingedly connected to the seat and for movement between a folded down storage position and an upright in use position.

The first means for adjustably connecting comprises a releasable locking pin and the distal end portions of the first leg of said aiming bracket and the seat brace being provided, respectively, with first and second arrays of registrable openings. The distal end portions are adapted to telescopically interfit with one another and register at least one opening of the first array with at least one opening of the second array. The locking pin is received in the registered of said one openings to connect and hold the aiming bracket in different positions relative to and spaced radially outwardly from the axis of rotation.

The second means for adjustably connecting comprises a releasable locking pin and the distal end portion of the second leg of the aiming bracket and the lower end portion of the rifle cradle sleeve including, respectively, first and second arrays of registrable openings. Similarly, the distal end portions are adapted to telescopically interfit with one another and register at least one opening of the first array with at least one opening of the second array, and the locking pin received in the one openings to connect and hold the rifle cradle assembly in different vertical positions relative to and upwardly from the horizontal plane of the seat brace.

The horizontal main support frame includes elongated rearward and forward support bars each terminating in a downwardly turned support leg for supporting the support frame on the ground. The seat support is centered between the opposite end portions of the rearward support bar. The guide rail includes opposite end portions atop and fixed to a respective opposite end portion of the rearward support bar and a medial portion atop and fixed to the medial portion of the forward support bar.

The horizontal main support frame is generally symmetrical to a centerline drawn through the seat support and the medial portion of the guide rail. The seat brace is adapted to rotate approximately 180° including 90° in each direction away from said centerline.

The rifle aiming seat apparatus further comprises means for releasably locking the seat brace to the main support frame. In one preferred locking arrangement, a line through the seat brace is align centered with the center line of the support frame and the seat brace is prevented from rotating away therefrom. Although a single lock point is provided, a plurality of angularly spaced points may be provided to orient the seat brace as desired.

In another embodiment according to this invention, there is provided a rifle aiming support assembly, said aiming support assembly comprising:

a horizontal main support frame, said frame including forward and rearward support bars and a guide bar, each bar including medial and opposite end portions and disposed symmetrically about a center line, a seat brace removably rotatably mounted to said frame, said brace including a proximal end portion mounted to said rearward support bar, seat structure, a medial portion, and a distal end portion, said seat structure including a seat fixedly mounted to said proximal end portion and a seat back hingedly mounted to said seat for movement between stored and in used positions, and the medial portion of said seat brace supported for movement atop said guide bar, an L-shaped rifle positioning bracket, said bracket including a first leg removably connected and positionable to and along the distal end portion of said seat brace and a second leg having a connectible upper end portion, a rifle cradle assembly, said assembly including a cradle sleeve removably connected and positionable to and along the upper end portion of said positioning bracket and a generally U-shaped upwardly open cradle pivotally connected to the upper end portion of the cradle sleeve and positionable at a selected angle relative to an imaginary line drawn through the geometric center of the cradle assembly.

The rifle aiming support assembly further comprises means for releasably locking the seat brace to the support frame and preventing the seat brace from moving away from a fixed position relative to the seat frame.

According to yet another embodiment of this invention, there is provided a kit of components for providing a transportable rifle aiming seat assembly, the kit comprising a horizontal support frame having a socket for receiving a pivot pin, an elongated seat brace having at a proximal end thereof a seat fixedly secured thereto and a pivot pin projecting therefrom for receipt in said socket whereby to mount the seat brace to the support frame for rotation relative thereto, said seat brace including a distal end portion provided with an array of registrable openings, and said seat including a seat back hingedly connected to said seat wherein to fold downwardly into a stored or transportation position when not in use and project upwardly when in an in use position, an L-shaped rifle positioning bracket having first and second legs each provided with a respective array of registrable openings, the first leg being connectible with the distal end portion of the seat brace for relative axial positioning movement therealong wherein to register a respective pair of openings therealong for receipt of a releasable locking pin, a rifle cradle assembly having a cradle sleeve provided with an array of registrable openings and an upwardly open rifle cradle for cradling a rifle pivotably connected to the cradle sleeve, the cradle sleeve and second leg being interconnectible with one another for relative axial positioning movement therebetween wherein to register a respective pair of openings therealong for receipt of a locking pin, and a plurality of quick release locking pins for receipt in respective of registered pairs of openings wherein to rapidly lock, and release, the rifle positioning bracket in a desired axial position along the seat brace and to lock, and release, the rifle cradle assembly in a desired vertical position at the end of the rifle cradle assembly.

In the kit of components, a lock socket operates between the seat brace and the frame, and a lock pin, or threaded fastener, is provided for locking entry into the lock socket and locking the seat brace from rotation.

Other features of the embodiments disclosed in this specification will become apparent from the following detailed description, taken in conjunction with the accompanying drawings, which illustrate, by way of example, the features of a rifle aiming support assembly and a kit for transporting and erecting the components of such assembly in the field.

DETAILED DESCRIPTION OF PREFERRED EMBODIMENTS

Referring now to the drawings, FIGS. 1-6 illustrate various embodiments of a rifle aiming seat apparatus, generally indicated by the reference number 10, adapted to be to be provided as components and in kit form to be assembled and supported on the ground for use and disassembled and transported when not in use. The discussion which follows describes a use wherein the aiming seat apparatus is supported on the ground, but the apparatus could be used on a ladder or tree stand, as are conventional and known to shooters.

The support apparatus 10 includes a horizontal main support frame 12, a seat brace 14 rotatably mountable to the frame, an L-shaped rifle aiming bracket 16 adjustably positionable to the brace, and a rifle cradle assembly 18 adjustably mounted to the aiming bracket. Although not shown, in some applications, an armrest may be detachably associated with the seat brace 14.

The horizontal main support frame 12 is adapted to be supported on the ground and includes axially elongated rearward and forward support bars 20 and 22 and a center strut 24. The support bars 20 and 22 terminate in downwardly turned support leg 20a and 20b, and 22a and 22b, respectively, for supporting the frame on the ground. The connecting strut 24 has opposite end portions 24a and 24b fixedly connected, respectively, to the midpoint or center 20c and 22c of the support bars 20 and 22, respectively. An imaginary line "C" through the center of the strut 24 passes through the centers 20c and 22c and symmetrically divides the support frame 12 into two like shaped halves.

A pad or seat support 26 projects upwardly from a fixed attachment to the midpoint 20c of the rearward support bar 20 and terminates in a generally flat support or mating face 26a. A cylindrical recess, socket or receptacle 28 projects downwardly from the mating face 26a.

A guide rail 30 of generally squared C-shape is atop the support frame 12. The guide rail 30 has opposite end portions 30a and 30b, respectively, fixedly attached atop the rearward support bar 20 and proximate the opposite end portions 20a and 20b thereof. Further, the guide rail has a medial portion 30c fixedly attached atop the forward support bar 22 and the medial portion 22c thereof. The top surface 30d of the guide rail 30 and the top surface 26a of the seat support 26 cooperate to form a generally horizontal plane. Further, the top surface 30d of the guide rail 30 forms a surface for supporting a medial portion 14c of the seat brace 14.

Figure 7A:
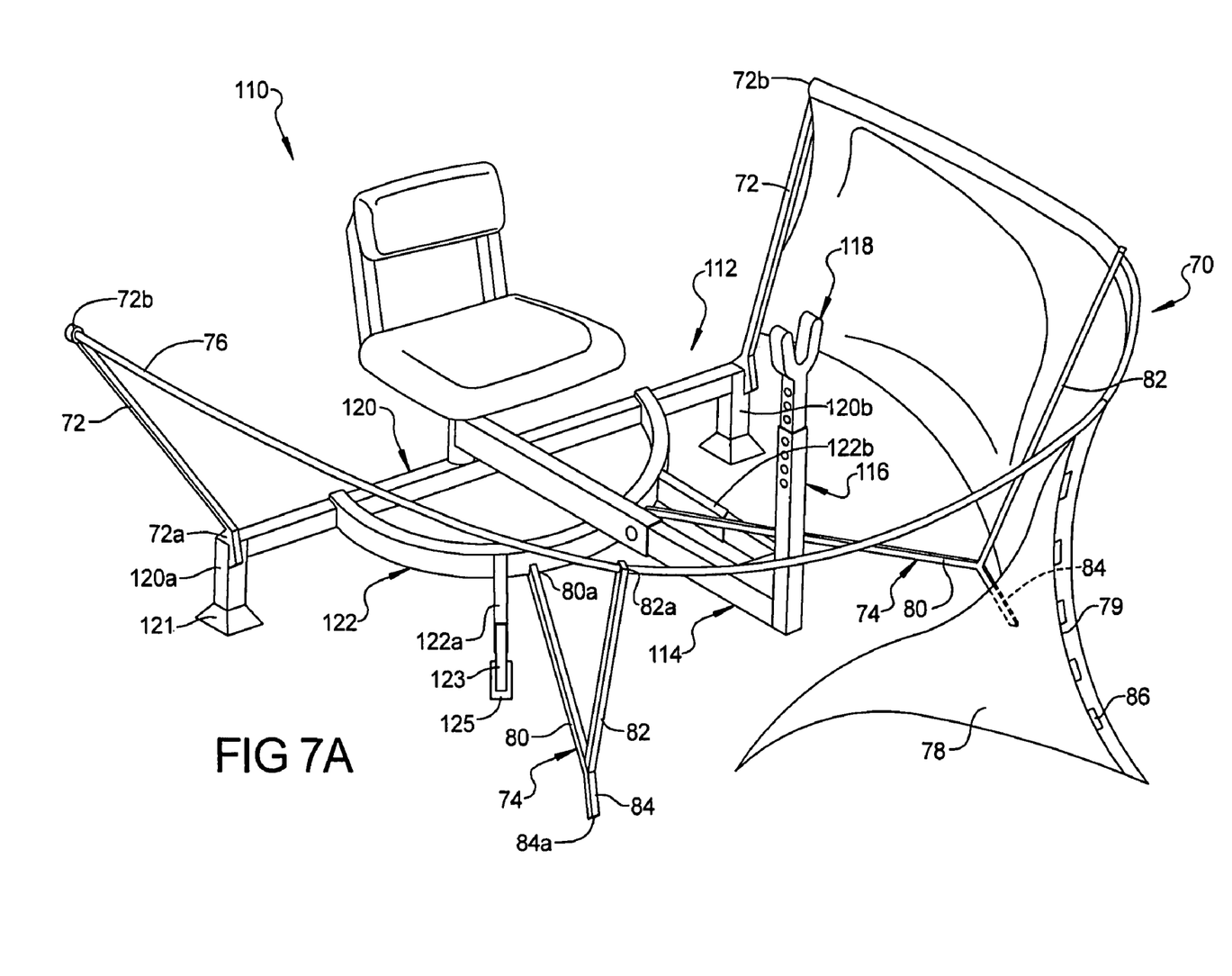
FIGS. 7A and 7B are perspective views looking down at a rifle aiming seat apparatus to which a hunting blind is being assembled and a side elevation view of the hunting blind assembled to the seat.
Figure 7B:
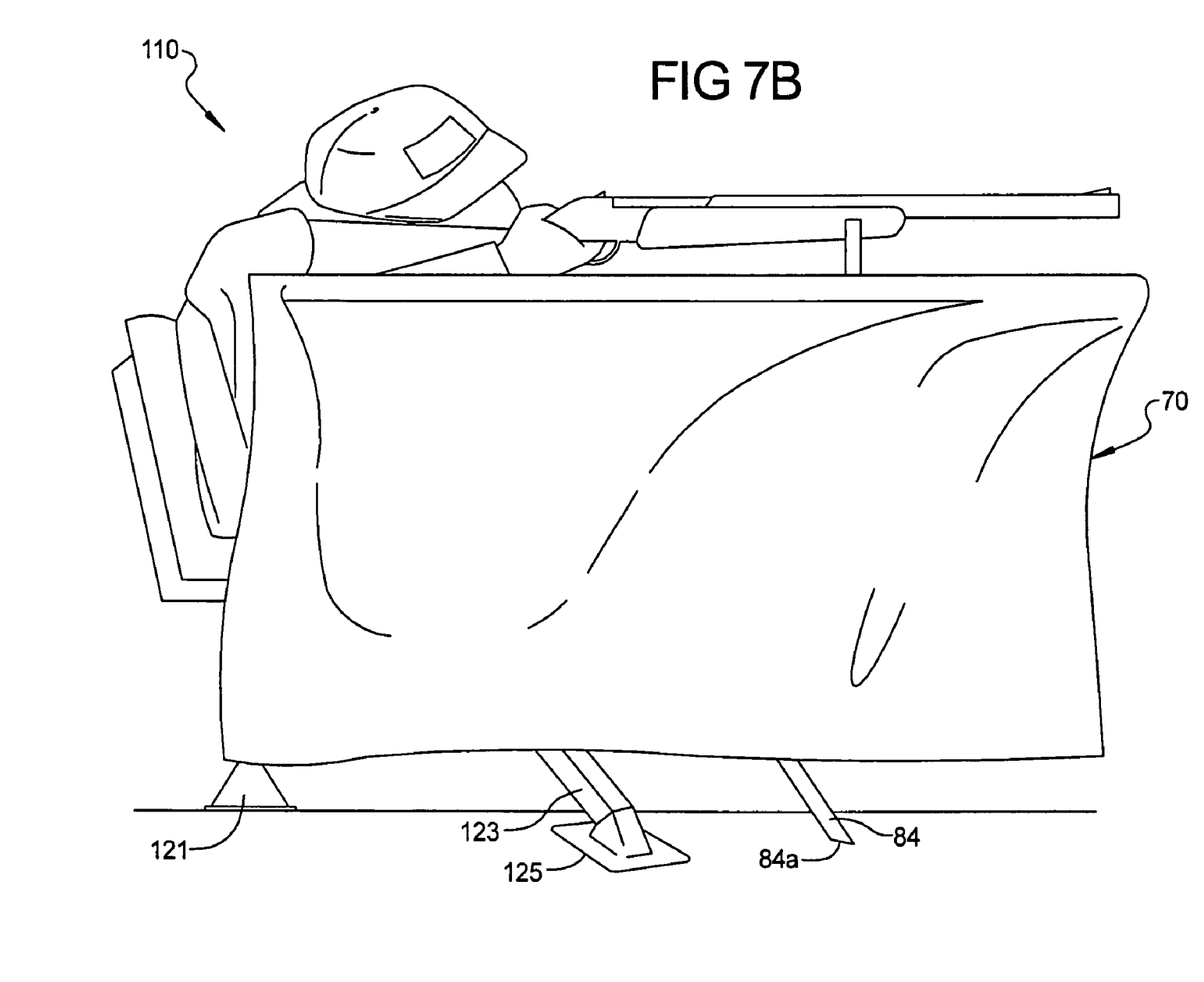

In some applications the support apparatus 10 will be used on an angled surface or irregular terrain, and the hunter will desire that the support frame 12, seat brace 14 and guide rail 30 be generally horizontally disposed for stability. The rearward support legs 20a and 20b and forward support legs 22a and 22b are provided with extender sleeves, each sleeve disposed for telescopic movement within the end portion of a respective support leg, and terminating in and enlarged foot or support pad that is seated on the ground. Each extender sleeve is adapted to move axially, towards or away from the associated support leg, by an amount desired, and then locked in place, whereby to form a horizontal surface for supporting the seat brace 14 for rotation. This arrangement is illustrated in FIGS. 7A and 7B, and shown by the legs 120a, 120b, 122a, and 122b and associated support pads 121.

The seat brace 14 is axially elongated and extends between proximal and distal end portions 14a and 14b and includes a medial portion 14c. Preferably, for strength and resistance to bending and torsion effects the seat brace is hollow tubing of square cross-section. As will be described below, an array of registrable openings 32 is provided in the distal end portion 14b for use in adjustably connecting the seat brace 14 to the rifle-aiming bracket 16.

A seat 34 is fixedly secured to the proximal end portion 14a of the seat brace 14. Specifically, the seat 34 has an under surface 34a fixedly secured atop and to the seat brace 14, and an upper surface 34b. Further, a seat back 36 is hingedly connected to the seat, such as by piano hinge structure 37, and for movement about a horizontal axis "A" and between a folded down storage position (i.e., in horizontal juxtaposed relation with the upper surface 34b) and an upright or vertical in use position.

The seat brace 14 is connected to the support frame 12 for rotation thereto and about a vertical axis "B". As shown, an elongated pivot pin 38 of cylindrical cross-section projects downwardly from the proximal end portion 14a for receipt in the socket 28. The pin-socket connection centers on the axis "B" and forms a pivot about which distal end portion 14b of the seat brace 14 rotates.

The medial portion 14c of the seat brace 14 is supported for rotation atop the guide rail 30 and the top surface 30d thereof. The seat brace is adapted to rotate approximately 180° relative to the centerline "C" and about 90° to each side of the centerline.

The rotatable connection may be reversed, in that the pivot pin 38 projects upwardly from the seat support 26 and the socket or recess 28 is formed in the proximal end portion 14a of the seat brace.

Preferably, the aiming apparatus is provided with arrangements to provide a quiet operation and silence possible sounds arising from the rotation of the seat brace 14 relative to the support frame 12. Noise arising from repositioning of the seat brace 14 relative to the support frame 12 may generate a noise that frightens or alerts potential targets.

In one arrangement, according to this invention, one or both of the lower surface 14c of the seat brace 14 and the upper surface 30d of the guide rail 30 which supports the brace portion 14c for rotation are coated with a sound deadening material, such as Teflon®, or provided with separate guides of such material. Additionally, the interior wall of the socket 28 and exterior surface of the pivot pin 38 may be provided with such material to deaden possible sounds arising from rotation of the seat brace relative to the support frame.

Preferably, to maintain the seat brace 14 orientation relative to the support frame 12, the lower surface of the brace portion 14c may be provided with a semi-cylindrical cut-out, or guide (not shown). The cutout is complementary to and adapted to fit about the upper half of the guide rail 30 and constrain and guide rotation of the seat brace 14 atop the guide rail and relative to the pin 38.

In another arrangement, a roller mechanism may operate between the guide rail 30 and the seat brace 14.

In some applications, such as in target shooting, the shooter may desire that the seat brace 14 be lockable in a desired position. In the embodiment illustrated, a lock plate 40 is fixed to and projects from the center 30*c* of the guide rail, registrable openings 44 and 46 are provided, respectively, in the lock plate 40 and the medial portion 14*c* of the seat brace, and a releasable locking pin (or threaded fastener) 48 is positioned in the openings 44 and 46. The lock pin 48 prevents the seat brace 14 from rotating relative to the support frame 12, and away from aligned relation with the centerline "C" of the support frame 12.

In some applications, relative rotation is prevented by the use of a clamp (not shown).

In some applications, and depending on the aiming situation, the shooter may desire that the seat brace 14 be locked at different angles relative to the centerline "C" of the support frame 12. In such case several registrable openings 44 are provided about the guide rail 30, each opening 44 being registrable with the opening 46 in the seat brace 14. In such arrangement, the seat brace 14 may rotate 90°, in opposite directions, away from centered relation with the centerline "C" of the support frame 12, and then locked in place.

The aiming bracket 16 is generally L-shaped and includes first and second legs 50 and 52 that are at right angles to one another and extend from a corner junction to respective distal end portions 50*a* and 52*a*. For strength, a support strut 53 angles between the legs 50 and 52.

Additionally, for strength and resistance to bending and torsion effects, the legs 50 and 52 are preferably of hollow tubing of square cross-section. The distal end portion 50*a* of the leg 50 and the distal end portion 14*b* of the seat brace 14 have mating cross-sections in that the end portions telescopically interfit within one another and the aiming bracket 16 is axially movable relative to the fitment.

Further, the distal end portions 50*a* and 52*a* of the legs 50 and 52 are provided, respectively, with an array of registrable openings 54 and 56. The openings 54 in the leg 50 are adapted to register with the openings 32 provided in the distal end portion 14*b* of the seat brace 14 when the leg 50 and seat brace 14 are telescopically interfitted with one another. A releasable locking pin 46 is inserted into a respective pair of registered openings 32 and 54 to lock and prevent the aiming bracket 16 from axial movement relative to the seat brace 14.

Preferably, the aiming bracket 16 is capable of being assembled, for use, and torn down, for transport. In this regard, the opposite end portions 50*b* and 52*b* of the legs 50 and 52 are connected by a removable pin 46 to form a corner joint. Further, the opposite end portions 53*a* and 53*b* of the support strut 53 are connected by a removable pin 46 to the opposite end portions 50*a* and 52*a*, respectively, of the legs 50 and 52.

The rifle cradle assembly 18 includes a cradle sleeve 58 provided with an array of registrable openings 60 and an upwardly open rifle cradle 62 pivotally connected to the cradle sleeve. Preferably, for strength and resistance to bending and torsion effects the cradle sleeve 58 is hollow tubing of square cross-section and adapted to interfit in telescopic relation with the second leg 52. The cradle sleeve 58 is axially movable relative to the fitment and adapted to bring respective of the openings 56 of the second leg 52 into register with the openings 60 of the cradle sleeve. A releasable locking pin 46 is inserted into a respective pair of registered openings 56 and 60 to lock and prevent the cradle sleeve 58 from axial movement relative to the second leg 52.

The rifle cradle 62 is generally U-shaped and upwardly open to receive and snugly position the forward end portion of the barrel of a long rifle. The rifle cradle 62 is pivotally connected to an upper end portion of the cradle sleeve and positionable at a selected angle relative to an imaginary line "D" drawn through the geometric center of the cradle assembly 18. The cradle may pivot in a first direction, towards and away from the seat 34. To accommodate right and left hand shooters, the cradle may also pivot in a second direction, sideways, relative to the seat 34.

As explained herein, the seat brace 14 simultaneously rotates the aiming bracket 16 relative to the support frame 12, with the shooter disposed on the seat 34 and in positioning relation with the rifle cradle 62. The aiming cradle assembly 18 is connectible in different positions along the seat brace 14, changing the axial separation between the vertical axis of rotation "A" and the vertical line "D" through the cradle assembly 18. The cradle assembly is oriented on an axis generally perpendicular to the horizontal plane. The height or vertical separation of the rifle cradle 62 relative to the horizontal plane is adjustable and movable into different positions along the second leg. That is, the cradle is movable vertically up or down relative to horizontal plane.

According to this invention, there is provided a kit of components for providing a transportable rifle aiming seat assembly. The kit comprises (1) the horizontal support frame 12 having the socket 28 for receiving the pivot pin 38, (2) the elongated seat brace 14 mountable to the support frame 12, the seat brace having the seat 34, the seat back 36 hingedly mounted to the seat, and the pivot pin 38 receivable in the socket 28 whereby to mount the seat brace to the support frame for rotation relative thereto, (3) the L-shaped rifle positioning bracket 16 adjustably connectible to the distal end 14*b* of the seat brace 14 for relative axial positioning movement therebetween, the bracket constructed by the assembly of legs 50 and 52 and strut 53, (4) the rifle cradle assembly 18 having the cradle sleeve 58 provided with an array of registrable openings, and the upwardly open rifle cradle 62 for cradling the barrel of a long rifle and pivotably connected to the cradle sleeve, the cradle sleeve being interconnectible with the rifle positioning bracket for relative vertical axial positioning movement therebetween, and (5) the plurality of quick release locking pins for receipt in respective of registered pairs of openings in the seat brace, the cradle sleeve and the rifle positioning bracket wherein to rapidly lock, and release, the rifle positioning bracket in a desired horizontal position along the seat brace and lock, and release, the rifle cradle assembly in a desired vertical position at the end of the rifle cradle assembly.

Further, the seat brace includes a lock plate and the kit comprises a lock socket, which operates between the lock plate and the seat brace for locking the seat brace from rotation.

In some embodiments, the kit may include an arm rest, connectible to the seat brace, for aiding the shooter in positioning the rifle relative to the cradle sleeve.

In some hunting applications, the hunter should be hidden from view. As shown in FIGS. 7A and 7B, an alternate embodiment of a rifle seat aiming apparatus, generally indicated by the reference number 110, is provided with structure to erect a hunting blind 70 for hiding or otherwise shielding the hunter from view. The seat aiming apparatus 110 is similar to the seat aiming apparatus 10 and includes a horizontal main support frame 112, a seat brace 114 rotatably mounted to the frame 112, an L-shaped rifle aiming bracket 116 adjustably positionable to the brace, and a rifle cradle assembly 118 adjustably positioned to the aiming bracket. The elements 112, 114, 116, and 118 operate in the manner described above regarding the corresponding elements 12, 14, 16, and 18 in the seat aiming apparatus 10.

The frame 112 includes a rearward support bar 120 having support legs 120a and 120b at opposite ends of the bar, a semicircular support bar 122 extending forwardly of the support bar, and a pair of support legs 122a and 122b at intermediate ends of the support bar 122. The support legs 120a and 120b and 122a and 122b are adjustable. The legs 120a and 120b are adapted to extend vertically and terminate in enlarged feet or support pads 121 that are adapted to be seated on the ground. The legs 122a and 122b include leg portions 123, the leg portions being adapted to extend axially and terminate in enlarged feet or support pads 125 adapted to be seated on the ground. In use, the support legs and feet cooperate to form a horizontal surface for supporting the seat brace 114 for rotation.

The hunting blind 70 includes a pair of first supports 72 disposed vertically, a pair of second supports 74, a support ring 76, and a closure blind or tarp 78. The first supports 72 have lower ends 72a removably pinned to respective ends of the support bar 120 and upper ends 72b. The second supports 74 are generally Y-shaped and include a pair of arms 80 and 82 disposed at an acute angle to one another and a strut 84. The arm 80 terminates in an upper end portion 80a that is removably pinned to the semicircular support bar 122. The arm 82 terminates in an upper end in the form of a receiving ring 82a for receiving the support ring 76. The strut 84 extends downwardly and away from the semicircular support bar and terminates in a free end 84a adapted to engage the ground.

The support ring 76 is of resilient bendable material, flexible and generally semicircular. The ring 76 has opposite ends removably attached to the upper ends 72b and intermediate portions fitted into the receiving rings 82a of the support arms 82. The upper ends 72b of the first supports 72 and rings 82a of the support arms 82 generally define a common horizontally disposed plane.

The closure tarp 78 is preferably comprised of weather resistant material and preferably provided with camouflage. The tarp 78 is adapted, much like a shower curtain, to be attached to the support ring 76 in a manner to hang downwardly and form a semicircular enclosure about the hunter when seated on the aiming apparatus. In this regard, an upper end portion 79 of the tarp 78, extending across the top and between the opposite lateral ends of the blind, is provided with a succession of complementary mateably engageable strips 86 of Velcro®. The upper end portion 79 is folded about the support ring 76 and the Velcro engaged, thus removably securing the tarp 78 to the support ring.

FIG. 7B illustrates the relationship of a hunter to the hunting blind 70 when seated in the aiming apparatus 110.

In some applications, the extensible legs and swivelable support pads of the support frame 12 may not make the seat frame horizontal in making the support frame 12 horizontal.

Figure 1:
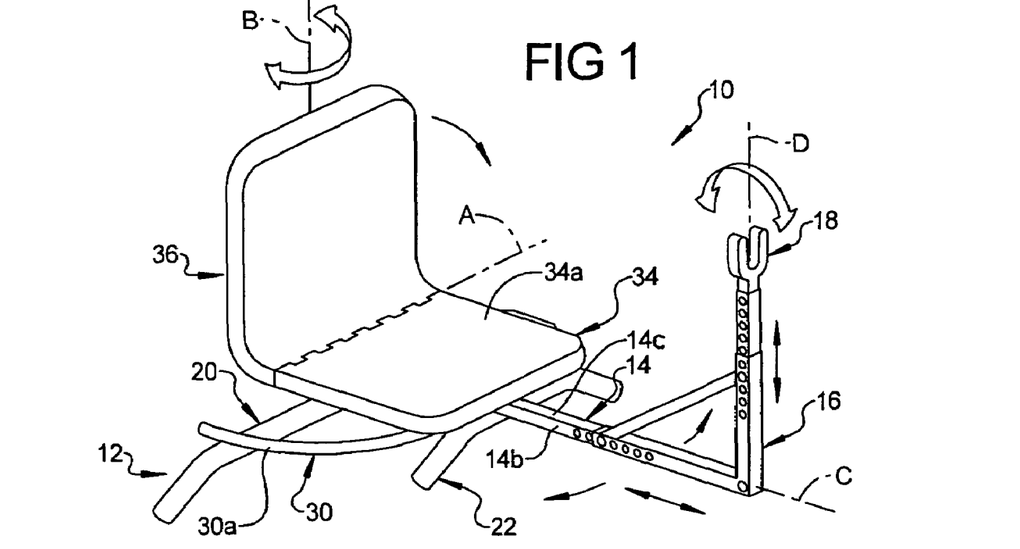
FIGS. 1 and 2 are front and rear perspective views looking down at a rifle aiming apparatus supported on the ground.
Figure 2:
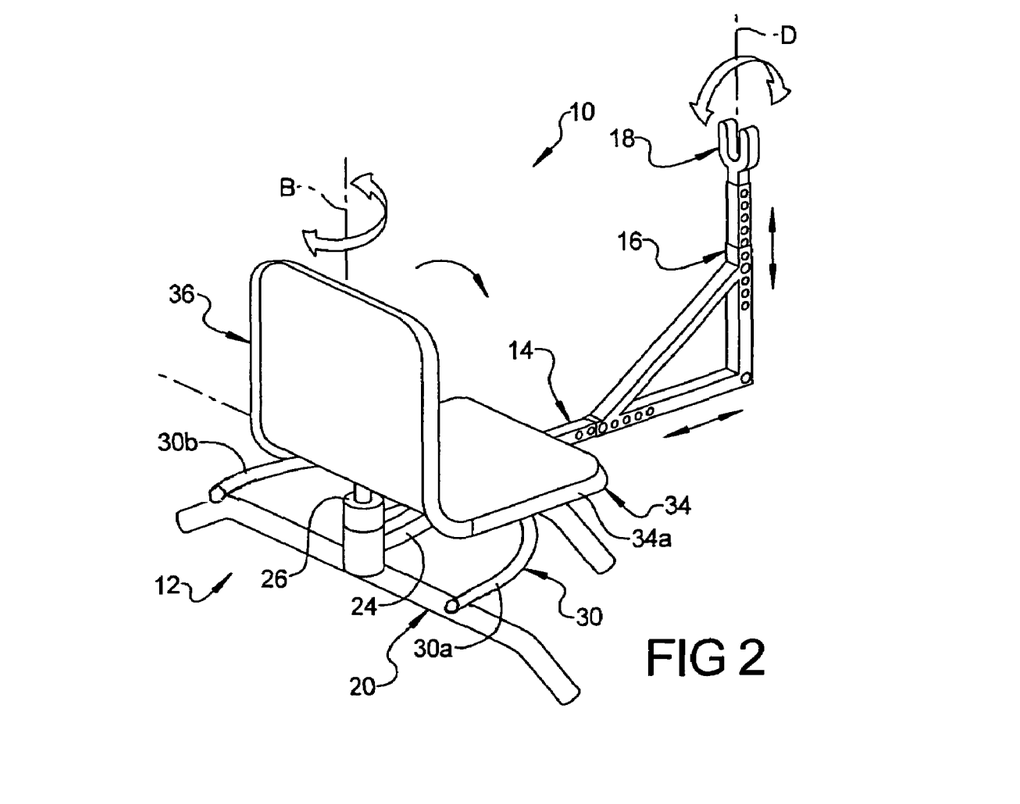
Figure 3:
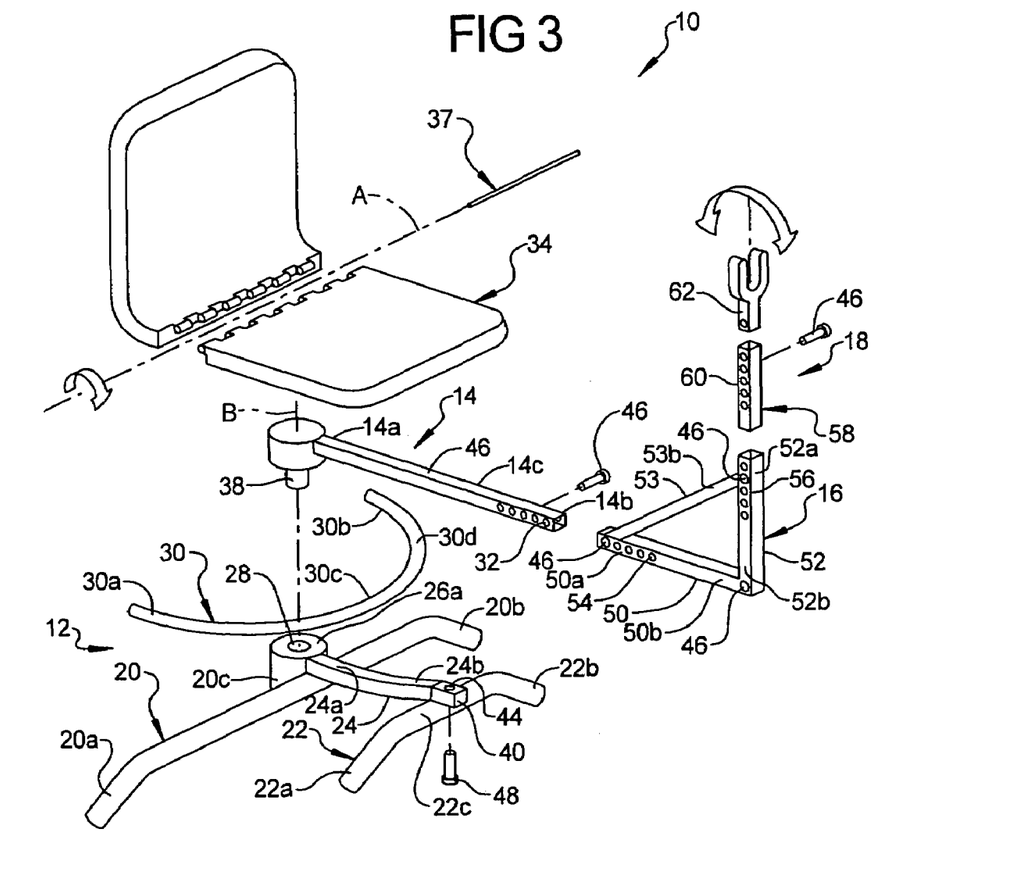
FIG. 3 is an exploded assembly view of the aiming apparatus with portions of the elements thereof partially removed to show features of the apparatus.
Figure 4:
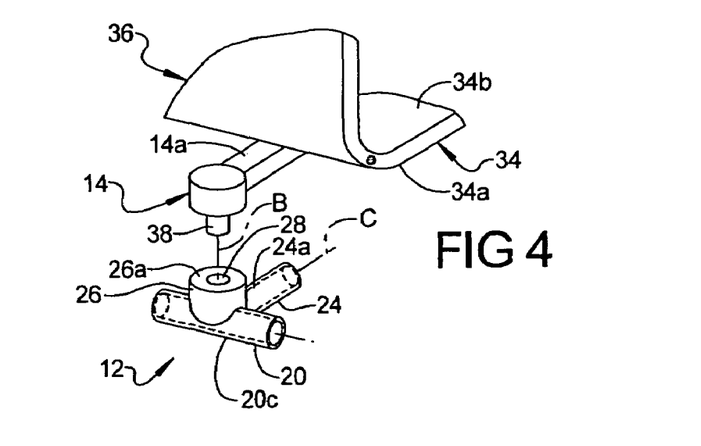
FIG. 4 is a perspective view showing a rifle aiming support positioned for assembly atop a frame of the aiming apparatus and rotation relative to the frame.
Figures 5, 6, 8A, 8B:
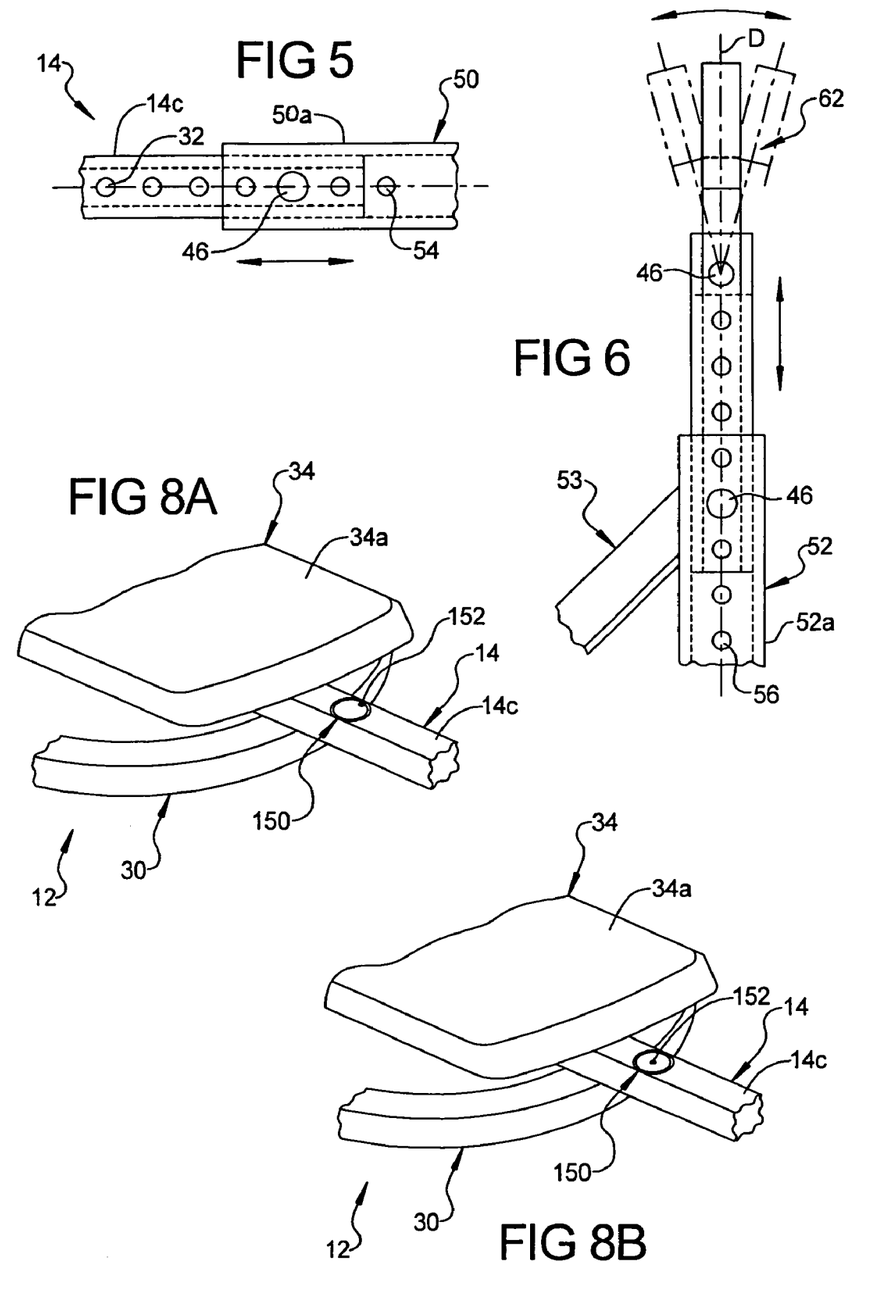
FIG. 5 is a side elevation view of a rifle aiming adjustment bracket mounted for horizontal movement to the forward end portion of the rifle aiming support.
FIG. 6 is a perspective view of an upper end portion of the aiming adjustment bracket, a rifle cradle mounted thereto, and an arrangement for changing the height and angular relation of the cradle relative to the adjustment bracket.
FIGS. 8a AND 8b are partial perspective views of the seat brace and including a leveling bubble associated therewith for ensuring that the support frame is horizontal.

Referring to FIGS. 8A and 8B, as an aid, a support level 150 is mounted to the seat brace 14 proximate to the seat 34a. in FIG. 8A, the "level" bubble 152 is not at the center, indicating the support frame 12 is not horizontal. The user would then adjust the legs, resulting in the bubble 152 being at the center of the support level 150, indicating that the support frame 12 is substantially horizontal.

The various, embodiments described above are by way of illustration only and not construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What I claim is:

1. A rifle aiming seat apparatus adapted to be assembled and supported on the ground for use and disassembled and transported when not in use, said rifle aiming seat apparatus comprising:

a support frame, said frame including a frame structure that includes a plurality of spaced apart support legs and a curved guide rail having opposite ends spaced about 180° and defining a plane, an imaginary bisecting line drawn through the midpoint of the guide rail defining a centerline of the frame, a seat brace having rearward and forward end portions and a seat connected to said rearward end portion, said rearward end portion being rotatably interconnected to said support frame by a pin for relative rotation therebetween and about a vertical axis, and said forward end portion being supported for angular gliding movement atop the guide rail from alignment with the centerline and between the opposite ends of the guide rail, a rifle barrel aiming bracket, said bracket being connected to the forward end portion of the seat brace for relative axial movement therebetween and fixed into selected axial positions therealong, the aiming bracket being horizontally movable towards and away from the pin, an extender sleeve, said sleeve being connected to the aiming bracket for relative axial movement therebetween and fixed into selected axial positions therealong, the sleeve being vertically movable towards and away from the ground, a rifle cradle mounted to the extender sleeve for angular movement relative to a vertical axis through the sleeve, the cradle being configured to receive the rifle barrel and locked into a selected angular position, and a hunting blind connected to the support frame for hiding the user from view when seated upon the seat and positioning the rifle barrel in the rifle cradle.

2. The rifle aiming seat apparatus as claimed in claim 1, wherein each support leg includes a support foot and means for connecting the support foot to the leg in a manner that the foot may extend towards or away from the connection to the leg, whereby the plurality of legs enable the support frame to be adjusted in a manner that the plane of the guide rail is horizontally disposed.

3. The rifle aiming seat apparatus as claimed in claim 2, wherein each said foot comprises an enlarged swivelable ground engaging pad.

4. The rifle aiming seat apparatus as claimed in claim 1, wherein said hunting blind comprises:

a curved support ring having opposite ends, means for supporting the support ring in vertically spaced relation to the guide rail in a manner that the opposite ends of said support ring and said guide rail cooperate to define a vertical plane that is substantially perpendicular to the plane of the guide rail, a rectangular shaped closure blind having upper and lower edges and laterally spaced opposite ends, and means for connecting the upper edge portion of the closure blind to the support ring in a manner that the closure blind hangs vertically downwardly therefrom, the closure blind being dimensioned such that when hung from the support ring the lower edge portion thereof is proximate to the ground, the laterally spaced opposite ends are positionable with the opposite ends of the guide rail, and the hunter is substantially enclosed within and hidden by and behind the closure blind.

5. The rifle aiming seat apparatus as claimed in claim 4, wherein said means for supporting the support ring comprises a pair of first struts and a pair of second struts, the struts extending upwardly and outwardly from the support frame and at an acute angle to the ground with said first struts projecting outwardly, upwardly and forwardly of the guide rail and said second struts projecting outwardly, upwardly and laterally away from the guide rail.

6. The rifle aiming seat apparatus of claim 1, wherein support frame includes a socket and said pivot pin extends from said seat brace for receipt into said socket.

7. The rifle aiming seat apparatus of claim 1, wherein said seat includes a seat back hingedly connected to the seat and for movement between a folded down storage position and an upright in use position.

8. The rifle aiming seat apparatus of claim 1, wherein each respective pair of said aiming bracket and the forward end portion of said brace, and said extender sleeve and the aiming bracket are telescopically interfittable with one another for slidable relative movement and provided with complementary sets of registrable locking apertures, and further comprising for each respective pair a releasable locking pin for interlocking with selected pairs of apertures.

9. The rifle aiming seat apparatus of claim 1, wherein the rifle cradle mounted to the extender sleeve is positioned for angular movement relative to the vertical axis through the extender sleeve in a first and second directions, said first direction being towards and away from the seat, and said second direction being in opposite lateral directions orthogonal to the plane of the first direction.

10. The rifle aiming seat apparatus of claim 1, further comprising means for releasably locking the seat brace in a desired angular position relative to the guide rail and between the opposite ends of the guide rail.

11. A rifle aiming support assembly, said aiming support assembly comprising:
a horizontal main support frame, said frame including forward and rearward support bars and a semi-circular shaped guide bar, each bar including medial and opposite end portions and disposed symmetrically about a center line,
a seat brace removably rotatably mounted to said frame, said seat brace including a proximal end portion mounted to said rearward support bar, a seat structure, a medial portion, and a distal end portion, said seat structure including a seat fixedly mounted to said proximal end portion and a seat back hingedly mounted to said seat for movement between stored and in use positions, and the medial portion of said seat brace supported for gliding movement atop and between the opposite ends of said guide bar,
an L-shaped rifle positioning bracket having first and second legs, said first leg being removably connected to the distal end portion of said seat brace and releasably locked thereto in selected positions therealong, and said second leg having a connectible upper end portion,
a rifle cradle assembly including a cradle sleeve and a cradle, the cradle sleeve being removably connected to the upper end portion of said second leg and releasably locked thereto in selected positions therealong, and said cradle being generally U-shaped, upwardly open, pivotally connected to the cradle sleeve, and releasably locked in selected angles relative to an imaginary line drawn through the geometric center of the cradle assembly.

12. The rifle aiming support assembly of claim 11, further comprising means for releasably locking and preventing the seat brace from moving away from a fixed position relative to the support frame.

13. The rifle aiming support assembly of claim 11, further comprising an erectable frame, said erectable frame including a plurality of struts that connect to the support frame in a manner to angle outwardly, upwardly and away from the support frame, a semi-circular shaped support bar having opposite ends, means for connecting the support bar to the struts in a manner that the support bar is generally parallel to and vertically above the guide bar and the opposite ends of the support bar and guide bar are disposed in a common vertical plane generally proximate to the seat structure, and a closure cover, the cover being mountable to the support ring and dimensioned to extend between the opposite ends thereof and form a closure about the seat structure.

14. The rifle aiming support assembly of claim 11, wherein said forward and rearward support bars define a plurality of spaced apart support legs, wherein each support leg includes means for leveling the support frame relative to the ground and in a manner that the guide bar is disposed generally horizontally.

15. The rifle aiming support assembly of claim 14, wherein said means for leveling includes, for each support leg, a support foot and means for connecting the support foot to the leg in a manner that the foot may extend towards or away from the connection to the leg, whereby the plurality of legs enable the support frame to be adjusted in a manner that the plane of the guide bar is horizontally disposed.

16. The rifle aiming seat apparatus as claimed in claim 15, wherein each said foot comprises an enlarged swivelable ground engaging pad.

17. A kit of components for providing a transportable rifle aiming seat assembly, the kit comprising
a horizontal support frame having a socket for receiving a pivot pin and a guide rail,
an elongated seat brace for removable mounting atop the support frame, the brace having proximal and distal end portions with the proximal end portion provided with a seat structure thereatop and a pivot pin projecting therebelow for receipt in said socket to removably mount the seat brace to the support frame for rotation relative thereto, said distal end provided with an array of registrable apertures, and said seat structure including a seat and a seat back hingedly connected to said seat wherein to fold downwardly into a stored or transportation position when not in use and project upwardly when in an in use position,
an L-shaped rifle positioning bracket having first and second legs, each leg provided with registrable apertures and the first leg being telescopically connectible with and removably mountable to the distal end portion of the seat brace for relative axial positioning movement of the sets of apertures,
a rifle cradle assembly including an extender sleeve provided with registrable apertures and an upwardly open rifle cradle for cradling a rifle pivotably connected to the cradle sleeve, the cradle sleeve and second leg being telescopically interconnectible with one another for relative axial positioning movement of the sets of apertures therebetween and removable from one another, and
a plurality of quick release locking pins for receipt in respective of registered pairs of apertures wherein to rapidly lock and/or release the rifle positioning bracket and erect the rifle cradle assembly in a desired positions.

18. The kit of claim 17, further comprising a lock socket and a lock pin, said lock socket being adapted to operate between the seat brace and the frame, and said lock pin for locking entry into the lock socket and locking the seat brace from rotation.

19. The kit of claim 17, further comprising erectable structure to form an enclosure about said support frame, said erectable structure including a plurality of struts that removably connect to the support frame, a support ring that removably connects to the struts in a manner to be disposed vertically above and in encircling relation about the support frame, and a closure curtain that removably connects to and hangs vertically downwardly from the support ring.

20. The kit of claim 17, wherein said support frame includes a plurality of support legs, further comprising frame leveling structure, said frame leveling structure comprising for each support leg, a ground engaging foot structure that is removable and axially positionable relative to the leg.

* * * * *